United States Patent
Chopra et al.

(10) Patent No.: US 11,604,611 B2
(45) Date of Patent: Mar. 14, 2023

(54) VARIABLE SPARING OF DISK DRIVES IN STORAGE ARRAY

(71) Applicant: EMC IP Holding Company LLC, Hopkinton, MA (US)

(72) Inventors: Shelesh Chopra, Bangalore (IN); Hemant Gaikwad, Bangalore (IN); Rahul Vishwakarma, Kolkata (IN); Sharath Talkad Srinivasan, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 129 days.

(21) Appl. No.: 17/386,454

(22) Filed: Jul. 27, 2021

(65) Prior Publication Data

US 2022/0398049 A1     Dec. 15, 2022

(30) Foreign Application Priority Data

Jun. 14, 2021    (IN) .............................. 202141026345

(51) Int. Cl.
*G06F 3/06* (2006.01)
*G06F 11/10* (2006.01)

(52) U.S. Cl.
CPC .......... *G06F 3/0689* (2013.01); *G06F 3/0619* (2013.01); *G06F 3/0631* (2013.01); *G06F 3/0647* (2013.01); *G06F 11/1084* (2013.01)

(58) Field of Classification Search
None
See application file for complete search history.

(56) References Cited

U.S. PATENT DOCUMENTS

| | | | |
|---|---|---|---|
| 10,467,075 B1 * | 11/2019 | Chatterjee | G06F 11/3034 |
| 2013/0132641 A1 * | 5/2013 | Suzuki | G06F 3/0688 |
| | | | 711/E12.008 |
| 2015/0121001 A1 * | 4/2015 | Muroyama | G06F 3/061 |
| | | | 711/114 |
| 2019/0220379 A1 * | 7/2019 | Li | G06F 3/0631 |

* cited by examiner

*Primary Examiner* — Michael Alsip
(74) *Attorney, Agent, or Firm* — Chamberlain, Hrdlicka, White, Williams & Aughtry (57) ABSTRACT

In general, embodiments relate to a managing a Redundant Array of Independent Disks (RAID) group. The embodiments include determining a minimum and maximum set of spare disks to allocate to the RAID group, wherein the RAID group comprises a plurality of active members, allocating the minimum number of spare members to the RAID group, allocating an additional spare member to the RAID group, setting a mode of the additional spare member to storage mode, enabling, after the setting, the RAID controller to store data in the plurality of active members and in the additional spare member, wherein the plurality of active members, the minimum number of spare members, and the additional spare member comprise persistent storage.

20 Claims, 4 Drawing Sheets

VARIABLE SPARING OF DISK DRIVES IN STORAGE ARRAY

BACKGROUND

In order to protect against potential loss of data in a storage system, it is often advantageous to implement a data protection scheme. Current data protection schemes may inefficiently utilize disks in the storage system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to method and systems for managing RAID groups. More specifically, in order to protect data stored within a storage array, a RAID controller may be used to store data in the storage array using a Redundant Array of Independent Disks (RAID) scheme. In a RAID scheme, data is divided into chunks, one or more parity values is calculated using the chunks, and then the chunks and the parity values (which may be collectively referred to as data) are stored across one or more disks in a RAID group. For example, if the RAID scheme is RAID-4, then the RAID group may have four disks (D1-D4), where three disks store data and one disk stores parity values. Depending on the implementation of RAID-4, the disk that is storing the parity values may rotate such that one disk in the RAID group does not store all of the parity values. If one of the disks, e.g., D1, fails, then the data and/or parity values in the other three disks may be used to regenerate the data and/or parity values that were stored on D1. However, prior to regenerating the data and/or parity values that were on D1, a new disk (referred to as spare disk 1 (SD1), is identified and then used to store the regenerated data and/or parity values.

To ensure that there are available spare disks to store the regenerated data and/or parity values (which may be collectively referred to as data), and to ultimately replace the failed disk, each RAID group may include a number of spare disks. However, while the disks (i.e., not the spare disks) are operating properly within the RAID group, the spare disks remain idle (i.e., unused). Thus, systems that implement RAID groups with spare disks may have to allocate a large number of spare disks, which remain unused.

One or more embodiments of the invention address the aforementioned issue by: (i) dynamically determining a minimum and maximum number of spare disks that are required for a given RAID group; (ii) allocating at least the minimum number of spare disks to each RAID group; and (iii) allocating additional spare disks to RAID groups, where these additional spare disks may operate in storage mode or in spare mode. In storage mode, the RAID controller may interact with the spare disk like it does with any other disk in the RAID group (i.e., it may read data from and write data to the spare disk). In spare mode, the RAID controller does not read data from, or write data, to the spare disk; rather, the spare disk remains idles until it is used to replace a failed disk or it is transitioned to storage mode. By allowing certain spare disks within a RAID group to operate, under certain conditions, in storage mode, embodiments of the invention enable RAID groups to utilize less dedicated spare disks (i.e., disks that can only operate as spare disks). This potentially decreases the number of dedicated spare disks required to be allocated to RAID groups.

Figure 1:
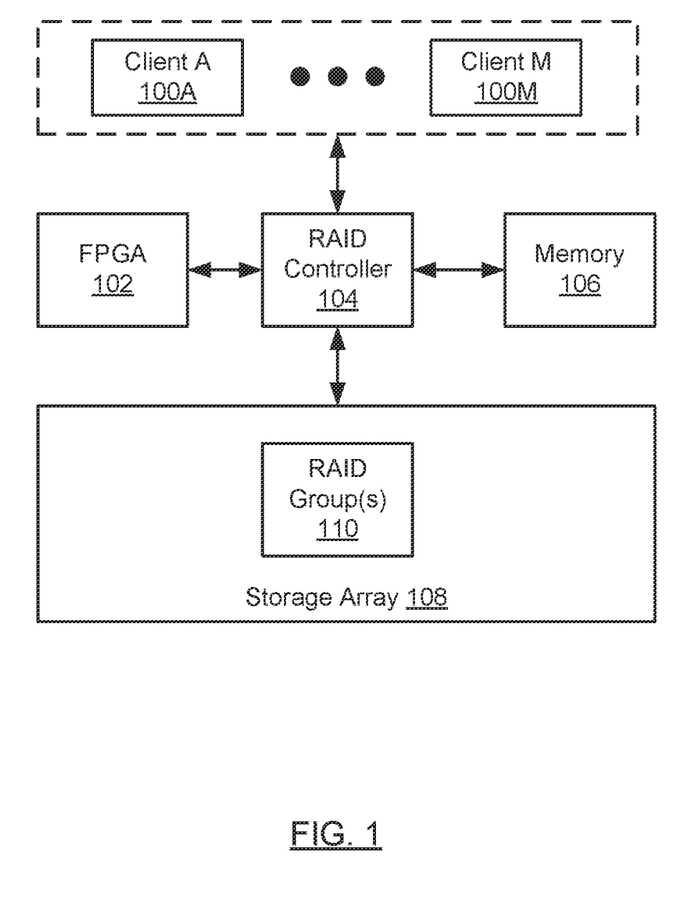
FIG. 1 shows a system in accordance with one or more embodiments of the invention.

FIG. 1 shows a system in accordance with one or more embodiments of the invention. As shown in FIG. 1, the system includes one or more clients (100A, 100M), a RAID controller (104), memory (106), optionally a field programmable gate array (FPGA) (102), and a storage array (108).

In one embodiment of the invention, a client (100A, 100M) is any system or process executing on a system that includes functionality to issue a read request, or a write request to the RAID controller (104). In one embodiment of the invention, the clients (100A, 100M) may each include a processor (not shown), memory (not shown), and persistent storage (not shown). In one embodiment of the invention, the RAID controller (104) is configured to read and write data in accordance with a RAID scheme (e.g., RAID-4, RAID-5, RAID-6, etc.), and to perform the methods shown in FIGS. 3 and 4. In one embodiment of the invention, the RAID controller (104) includes a processor configured to execute instructions to implement one or more embodiments of the invention, where the instructions are stored on a non-transitory computer readable medium (not shown), that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the invention, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the invention, the memory (106) is configured to temporarily store various data (including parity value) prior to such data being stored in the storage array.

In one embodiment of the invention, the FPGA (102) (if present) includes functionality to calculate P and/or Q parity values for purposes of storing data in the storage array (108), and/or functionality to perform various calculations necessary to recover corrupted data stored using the RAID scheme. The RAID controller (104) may use the FPGA (102) to offload the processing of various data in accordance with one or more embodiments of the invention.

In one embodiment of the invention, the storage array (108) includes a number of individual persistent storage devices (which may be referred to as disks) including, but not limited to, magnetic memory devices, optical memory devices, solid state memory devices, phase change memory devices, any other suitable type of persistent memory device, or any combination thereof.

The persistent storage devices within the storage array may be logically divided into one or more RAID groups (110). Each RAID group includes a combination of active members and spare members (which may be dedicated spare members or dual purpose spare members). Additional detail about RAID groups is provided in FIG. 2.

Those skilled in the art will appreciate that while FIG. 1 shows an FPGA, the invention may be implemented without an FPGA. Further, those skilled in the art will appreciate that other components may be used in place of the FPGA without departing from the invention. For example, the invention may be implemented using an Application Specific Integrated Circuit (ASIC)(s), a graphics processing unit(s) (GPU), a general purpose processor(s), any other hardware device capable of calculating P and/or Q parity values for purposes of storing data in the storage array, and/or performing various calculations necessary to recover corrupted data stored using the RAID scheme, any devices that include a combination of hardware, firmware, and/or software configured to calculate P and/or Q parity values for purposes of storing data in the storage array (108), or any combination thereof.

Figure 2:
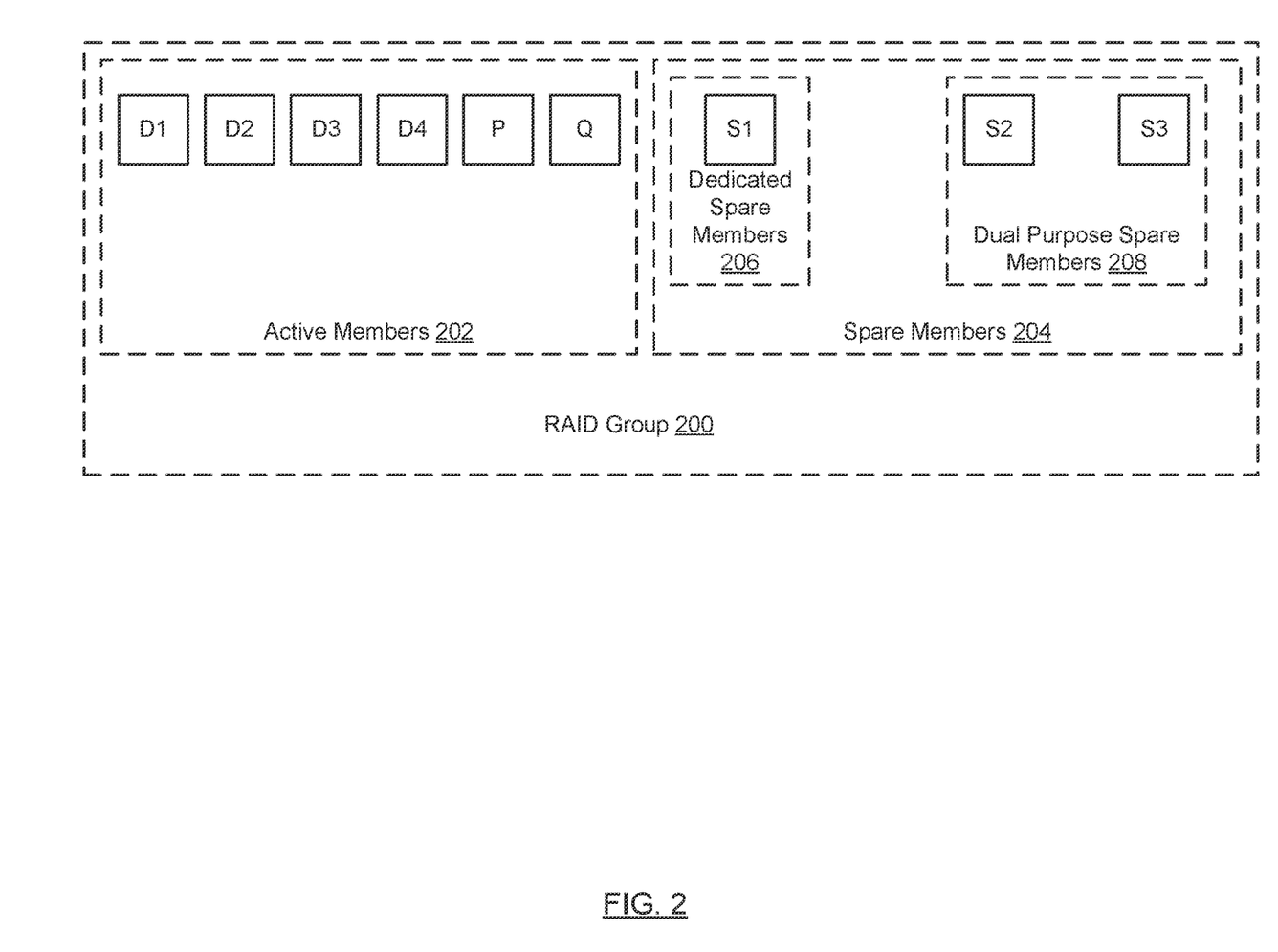
FIG. 2 shows a RAID Group in accordance with one or more embodiments of the invention.

FIG. 2 shows a RAID group in accordance with one or more embodiments of the invention. The RAID group (200) shown in FIG. 2 is an exemplary RAID group and is not intended to limit the scope of the invention.

Turning to FIG. 2, disks that make up the RAID group (200) are divided into two logical sub-portions: active members (202) and spare members (204). The active members (202) sub-portion includes disks that are actively being written to by the RAID controller. For example, as shown in FIG. 2, the active members include disks D1-D4, P and Q, where D1-D-4 store data chunks while disks P and Q store parity values.

In one embodiment of the invention, the P parity value is a Reed-Solomon syndrome and, as such, the P Parity function may correspond to any function that can generate a Reed-Solomon syndrome. In one embodiment of the invention, the P parity function is an XOR function.

In one embodiment of the invention, the Q parity value is a Reed-Solomon syndrome and, as such, the Q Parity function may correspond to any function that can generate a Reed-Solomon syndrome. In one embodiment of the invention, a Q parity value is a Reed-Solomon code. In one embodiment of the invention, $Q = g^0 \cdot D0 + g^1 \cdot D1 + g^2 \cdot D2 + \ldots + g^{n-1} \cdot Dn-1$, where Q corresponds to any one of the Q parity values defined with respect to FIG. 2, g is a generator of the field, and the value of D corresponds to the data (which may include both values from the data grid and/or values from one or more rows or columns that include P or Q parity values).

Those skilled in the art will appreciate that while the RAID group in FIG. 2 includes P and Q parity values, embodiments of the invention may be implemented using greater or fewer parity values without departing from the invention. For example, each RAID group may only include a P parity value. In another example, each RAID group may include three parity values. The aforementioned examples are not intended to limit the invention. In one embodiment of the invention, regardless of the number of parity values used in the implementation of the invention, each of the parity values is a Reed-Solomon syndrome.

Continuing with the discussion of FIG. 2, spare members (204) sub-portion includes one or more spare disks designated as dedicated spare members (206) (e.g., S1) and zero or more spare disks designated as dual purpose spare members (208) (e.g., S2 and S3). In one embodiment of the invention, the total number of spare disks that are designated as dedicated spare members (206), is equal to the minimum number of spare disks required to be allocated to the RAID group (see e.g., FIG. 3) and the total number of disks in the spare members (204) sub-portion of the RAID group is less than or equal to the maximum number of spare disks required to be allocated to the RAID group (see e.g., FIG. 3). The total number of spare disks that are designated as dual purpose spare members (208), is equal to the difference between the total number of disks allocated to the spare member (204) sub-portion of the RAID group, and the minimum number of spare disks required to be allocated to the RAID group.

If the RAID group includes one or more dual purpose spare members (i.e., disks in a storage mode), then the RAID controller interacts with them in the same manner as it interacts with the disks that are designated as active members (202). For example, the one or more dual purpose spare members may store data and/or parity values (collectively referred to as data) in accordance with the RAID scheme being implemented by the RAID controller.

Figure 3:
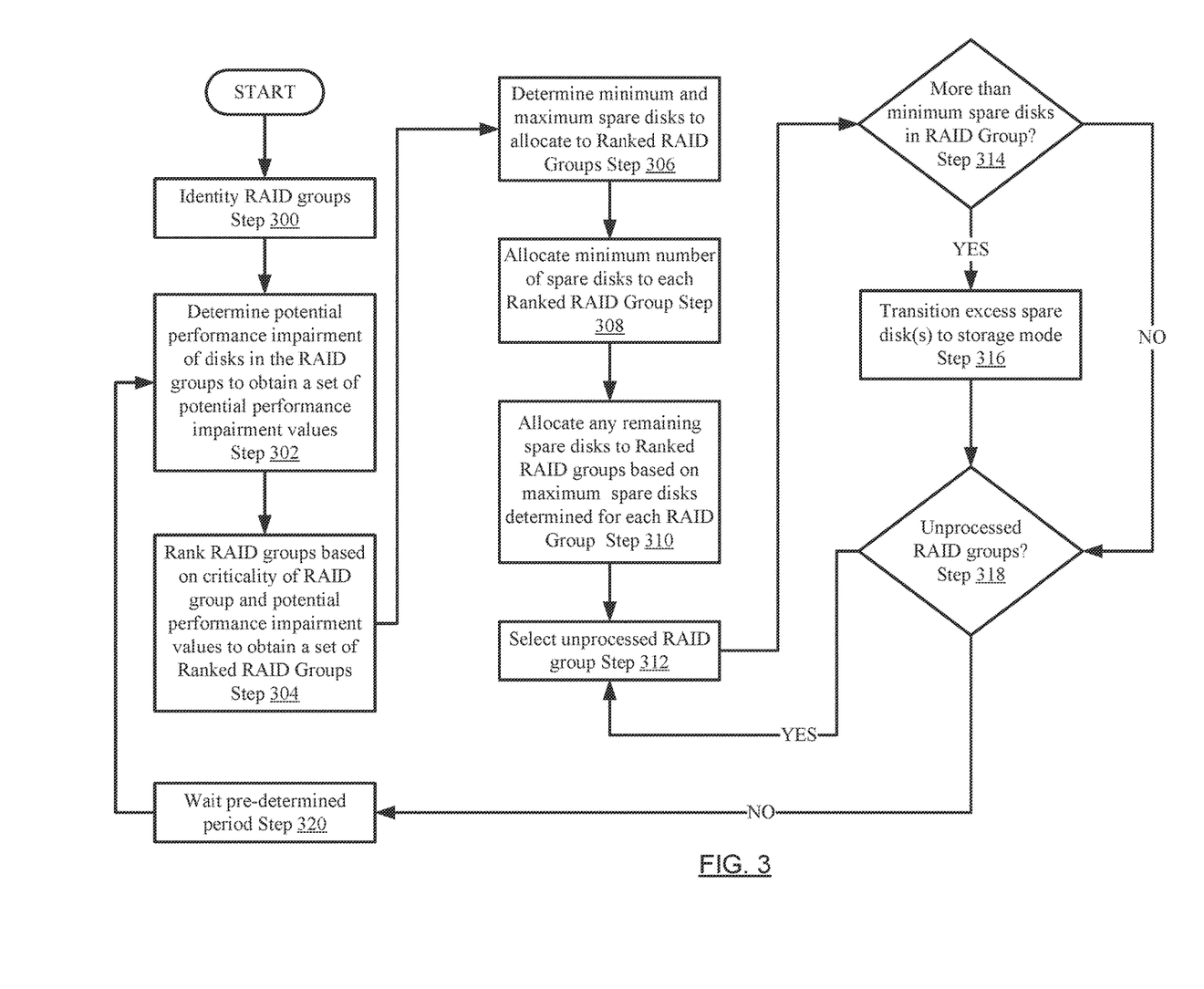
FIG. 3 shows a flowchart of a method for determining allocation of spare disks in a RAID Group in accordance with one embodiment of the invention.

FIG. 3 shows a flowchart of a method in accordance with one or more embodiments of the invention. The method depicted in FIG. 3 may be performed to provide a method for determining allocation of spare disks in a RAID Group in accordance with one embodiment of the invention. The method shown in FIG. 3 may be performed by, for example, a RAID Controller (e.g., 104, FIG. 1). Other components of the system in FIG. 1 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel, and/or partially overlapping manner without departing from the invention.

In step 300, one or more RAID groups are identified. In one embodiment of the invention, the RAID controller may have previously determined a RAID scheme to implement, determined the number of RAID groups to implement, and then assigned each RAID group a minimum number of required disks from the storage array for the RAID scheme. For example, if the RAID scheme is RAID-6, then six disks are originally allocated to each RAID group. At this stage, each RAID group may only have active members as no spare members have been allocated to the RAID groups. The RAID controller includes functionality to track each RAID group and its membership.

In step 302, a potential performance impairment value (PPIV) for each of the RAID groups is obtained. In one embodiment of the invention, the PPIV used to quantify (on an absolute or relative basis) the likelihood of a RAID group failing (i.e., how failure prone is the RAID group). To determine the PPIV for the RAID groups, each of the disks designated as active members of the RAID group are classified using a fuzzy classifier (which may be implemented within or externally to the RAID controller), that classifies reach drive using a number between 0 and 1, where 0 represents a good drive and 1 represents a bad drive. The classification may be implemented using transductive confidence machines, a Venn-ABERS predictor, any other fuzzy classification mechanism, or any other mechanism that can quantify whether a disk is good or bad (or some combination thereof, e.g., represented by a number between 0 and 1). The classification of each individual disk may then be analyzed on a per-RAID group basis to determine how likely a given RAID group is to fail. In this context, a RAID group is likely to fail if one or more of its active members is likely to fail.

In step 304, the RAID groups are ranked using the PPIVs and the criticality associated with each RAID group to obtain a set of Rank RAID groups. The criticality of a given RAID group corresponds to the absolute or relative importance of the data that is stored in the RAID group. For example, if the RAID group is storing key financial data for a company, then this RAID group may be more important than a RAID group that is storing archived emails that are more than seven years old. The criticality of a given RAID group may be determined using any heuristic without departing from the invention.

In one embodiment of the invention, a RAID group that has a high criticality and a high PPIV is ranked higher than a RAID group that has a high criticality and a relatively lower PPIV. Further, a RAID group has a high criticality if it is ranked higher than a RAID group that has a relatively lower criticality, regardless of the PPIV of each of the aforementioned RAID groups. Finally, a RAID group that has a low criticality, and a high PPIV, is ranked higher than a RAID group that has a low criticality and a relatively lower PPIV.

As discussed below, the RAID ranking is used, in part, to determine how to allocate the spare disks.

In step 306, the minimum and maximum number of spare disks to allocate to each RAID group is determined. The determination in step 306 may be based, at least in part, on the criticality of each of the RAID groups. For example, a RAID group with a higher criticality is associated with a higher minimum and, potentially, a higher maximum number of spare disks.

In step 308, at least the minimum number of spare disks is allocated to each of the RAID groups based on the minimum number of spare disks determined in step 306. In one embodiment of the invention, step 308 is used to ensure that each RAID group is allocated at least the minimum number of spare disks.

In step 310, when there are remaining spare disks to allocate, e.g., after the initial allocation in step 308, then the remaining spare disks are allocated, based on the ranking (determined in Step 304). The allocation in step 310 may include: (i) selecting the highest ranked RAID group that does not have the maximum number of spare disks allocated; (ii) determining a maximum amount of additional spare disks that can be allocated to the RAID group identified in (i) (which is the difference between the maximum spare disks that can be allocated and the minimum spare disks already allocated), (iii) allocating, availability permitting, up to the maximum amount of additional spare disks to the RAID group identified in (i); and (iv) if there are any remaining spare disks to allocate, repeating steps (i)-(iv). The method described above allocates the remaining spare disks based on the rank of the RAID group. Other methods may be used to allocate spare disks in step 310 without departing from the invention.

At this stage, all spare disks allocated in steps 308 and 310 are set to (or currently in) a spare mode.

In step 312, after the allocation of all spare disks, an unprocessed RAID group is selected.

In step 314, a determination is made about whether the selected RAID group has more than the minimum number of spare disks allocated. If the selected RAID group has more than the minimum number of spare disks allocated, the process proceeds to step 318; otherwise, the process proceeds to step 316.

In step 316, all additional spare disks allocated to the RAID group (i.e., all spare disks greater than the minimum number of spare disks) are designated as dual purpose disks and their mode is transition to storage mode.

In step 318, a determination is made about whether there are unprocessed RAID groups. If there are unprocessed RAID groups, the process proceeds to step 312; otherwise, the process proceeds to step 320.

In step 320, the RAID controller (or another entity that is performing the method in FIG. 3) waits a pre-determined period of time and then performs step 302-320 again. The pre-determined period may be set to any duration. The intent of the pre-determined period is, to allow the system to operate based on the analysis done in the prior iteration of steps 302-318, and then re-perform these steps to take into account any changes in the PPIV, and/or criticality of the RAID groups.

In subsequent iterations of the steps 302-318, steps 308 and 310 may re-allocate spare disks between different RAID groups; however, such re-allocation may also require data to be migrated off of spare disks that are designated as dual purpose spare members, prior to the disks being re-allocated to a different RAID group.

Further, in subsequent iterations of step 308, as there are already spare disks allocated to the RAID group, step 308 in the subsequent iterations involves determining whether the spare disks previously allocated to the RAID group satisfies the minimum number of spare disks. In scenarios where there are a sufficient number of spare disks designed as dedicated spare members to satisfy the minimum number of spare disks, no further allocation action needs to be performed on the RAID group in step 308.

Figure 4:
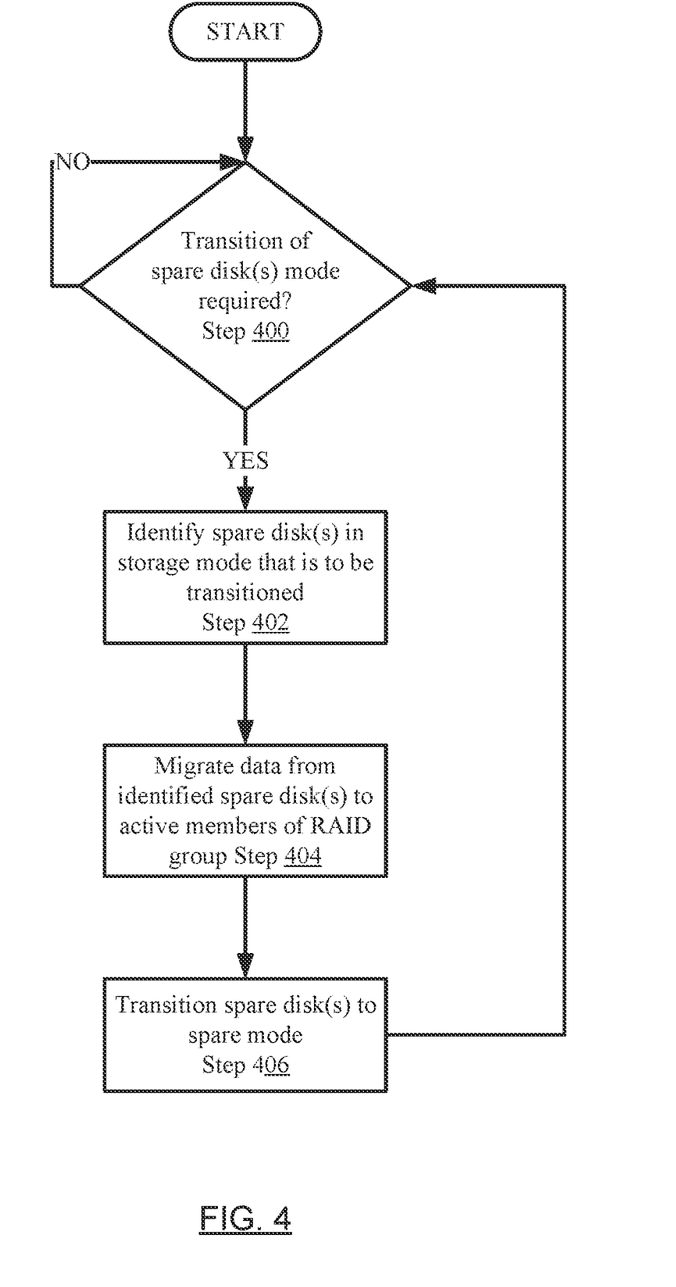
FIG. 4 shows a flowchart of a method for modifying the operation of a spare disk in accordance with one embodiment of the invention.

In scenarios where there are a sufficient number of spare disks to satisfy the minimum number of spare disks, but some of these spare disks are designated as dual purpose spare members, then the method shown in FIG. 4 may be required to be performed; such that a sufficient number of spare disks that are designated as dual purpose spare members are re-designated as dedicated spare members.

In scenarios where there are not a sufficient number of spare disks to satisfy the minimum number of spare disks, then the method shown in FIG. 4 may be required to be performed; such that all spare disks that are designated as dual purpose spare members are re-designated as dedicated spare members, and further additional spare disks designated as dedicated spare members needs to be allocated to the RAID group.

Further, in subsequent iterations of step 310, as there are already spare disks allocated to the RAID group, step 310 in the subsequent iterations involves determining whether the spare disks previously allocated to the RAID group satisfies the maximum number of spare disks. If the allocated number of spare disks satisfies the maximum number of spare disks, no further action in 310 needs to be performed; however, if the allocated number of spare disks does not satisfy the maximum number of spare disks, the step 310 may include additional allocations.

FIG. 4 shows a flowchart of a method in accordance with one or more embodiments of the invention. The method depicted in FIG. 4 may be performed to provide a method for modifying the operation of a spare disk in accordance with one embodiment of the invention. The method shown in FIG. 4 may be performed by, for example, a RAID Controller (e.g., 104, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel, and/or partially overlapping manner without departing from the invention.

The method shown in FIG. 4 may be performed when there is a change in conditions of a given RAID group, e.g., a failed disk or a change in the minimum and maximum number of spare disks to allocate to the RAID group.

In step 400, a determination is made about whether to transition a spare disk from storage mode to spare mode. This determination may be triggered due to a variety of different scenarios. The following describes two potential scenarios. The scenarios are not intended to limit the scope of the invention.

Scenario 1—Consider a scenario in which the RAID group has four active members, two dedicated spare members (which is the minimum required for this RAID group in this example), and two dual purpose spare members. If one of the active disks fails, then one of the dedicated spare members will transition to being an active member. Once this occurs, the number of dedicated spare disks in the RAID group is only one. In response to this determination, one of dual purpose spare members (which was previously being used by the RAID controller to store data) needs to be transitioned to storage mode so that it can be designated as a dedicated spare member.

Scenario 2—Consider a scenario in which the RAID group has four active members, two dedicated spare members (which is the minimum required for this RAID group in this example), and two dual purpose spare members. During an iteration of FIG. 3, a determination is made that the RAID group needs to have three dedicated spare members. In response to this determination, one of dual purpose spare members (which was previously being used by the RAID controller to store data) needs to be transitioned to storage mode so that it can be designated as a dedicated spare member.

Continuing with the discussion of FIG. 4, in step 402, one or more disks that need to be transitioned from storage mode to spare mode, are identified. The number of disks that need to be transitioned may vary based on the scenario that triggered the transition.

In step 404, data are migrated from the identified spare disks to disks that are designated as active members in the RAID group of which the identified spare disk is a member. In one or more embodiments of the invention, the RAID controller can only store data in the additional spare member up to a threshold amount, wherein the threshold amount is less than or equal to a sum of the remaining storage capacity of the active members in the RAID group. As the amount of data stored in the active members increases, the threshold amount subsequently decreases. By limiting the amount of data that can be stored in the spare disks, when a data from a spare disk needs to be migrated, there is sufficient capacity to migrate the data from the spare disk (which is operating in storage mode) to a disk that is designated as an active member. While the migration is being performed no new data may be written to the spare disks from the data that is being migrated.

In step 406, once the migration of data from the spare disks is completed, the identified spare disks are transitioned to spare mode. At this stage, the spare disk is now designated as a dedicated spare disk.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. A method for managing a Redundant Array of Independent Disks (RAID) group, the comprising:

determining a minimum and maximum set of spare disks to allocate to the RAID group, wherein the RAID group comprises a plurality of active members;

allocating the minimum number of spare members to the RAID group;

allocating an additional spare member to the RAID group;

setting a mode of the additional spare member to storage mode;

enabling, after the setting, the RAID controller to store data in the plurality of active members and in the additional spare member, wherein the plurality of active members, the minimum number of spare members, and the additional spare member comprise persistent storage.

2. The method of claim 1,
wherein the RAID group is one of a plurality of RAID groups;
wherein the method further comprises:
analyzing the plurality of RAID groups to determine a plurality of potential performance impairment values for the plurality of RAID groups;
ranking the plurality of RAID groups based on the plurality of potential performance impairment values and a criticality associated with each of the plurality of RAID groups to obtain a RAID group ranking; and
wherein determining the minimum and maximum set of spare members to allocate to the RAID group is based on the RAID group ranking.

3. The method of claim 2, wherein allocating the minimum number of spare members to the RAID group, and allocating an additional spare member to the RAID group is based on the RAID group ranking.

4. The method of claim 1, further comprising:
after the enabling, determining that the additional spare member needs to transition to spare mode;
based on the determining, migrating data stored on the additional spare member to at least a portion of the plurality of active members;
transitioning, after the migrating, the additional spare member to spare mode, wherein the RAID controller is not able to store data in the additional spare member after it has transitioned to the spare mode.

5. The method of claim 1, wherein the RAID controller is not able to store data in any of the spare members.

6. The method of claim 1, wherein the RAID controller can only store data in the additional spare member up to a threshold amount, wherein the threshold amount is less than a capacity of the additional spare member.

7. The method of claim 1, wherein the RAID controller can only store data in the additional spare member up to a threshold amount, wherein the threshold amount is less than or equal to a sum of the remaining storage capacity of the plurality of active members.

8. A system for providing computer implemented services using information handling systems, comprising:
a storage array comprising a plurality of disks, wherein each of the plurality of disks is associated with one of a plurality of Redundant Array of Independent Disks (RAID) groups; and
a RAID controller programmed to:
determine a minimum and maximum set of spare disks to allocate to the RAID group, wherein the RAID group comprises a plurality of active disks;
allocate the minimum number of spare disks to the RAID group;
allocate an additional spare disk to the RAID group;
set a mode of the additional spare disk to storage mode;
enable, after the setting, the RAID controller to store data in the plurality of active disks and in the additional spare disks,
wherein each of the plurality of active disks, the minimum number of spare disks, and the additional spare disks is one of the plurality of disks.

9. The system of claim 8,
wherein the RAID group is one of a plurality of RAID groups;
wherein the RAID controller programmed is further programmed to:
analyze the plurality of RAID groups to determine a plurality of potential performance impairment values for the plurality of RAID groups; and
rank the plurality of RAID groups based on the plurality of potential performance impairment values and a criticality associated with each of the plurality of RAID groups to obtain a RAID group ranking,
wherein determining the minimum and maximum set of spare disks to allocate to the RAID group is based on the RAID group ranking.

10. The system of claim 9, wherein allocating the minimum number of spare members to the RAID group, and allocating an additional spare member to the RAID group is based on the RAID group ranking.

11. The system of claim 8, wherein the RAID controller is further programmed to:
after the enabling, determine that the additional spare disk needs to transition to spare mode;
based on the determining, migrate data stored on the additional spare disk to at least a portion of the plurality of active disks;
transition, after the migrating, the additional spare disk to spare mode, wherein the RAID controller is not able to store data in the additional spare disk after it has transitioned to the spare mode.

12. The system of claim 8, wherein the RAID controller is not able to store data in any of the spare disks.

13. The system of claim 8, wherein the RAID controller can only store data in the additional spare disk up to a threshold amount, wherein the threshold amount is less than a capacity of the additional spare disk.

14. system of claim 8, wherein the RAID controller can only store data in the additional spare disk up to a threshold amount, wherein the threshold amount is less than or equal to a sum of the remaining storage capacity of the plurality of active disks.

15. A non-transitory computer readable medium comprising computer readable program code, which when executed by a processor enables the processor to perform a method for managing a Redundant Array of Independent Disks (RAID) group, the method comprising:
determining a minimum and maximum set of spare disks to allocate to the RAID group, wherein the RAID group comprises a plurality of active members;
allocating the minimum number of spare members to the RAID group;
allocating an additional spare member to the RAID group;
setting a mode of the additional spare member to storage mode;
enabling, after the setting, the RAID controller to store data in the plurality of active members and in the additional spare member,
wherein the plurality of active members, the minimum number of spare members, and the additional spare member comprises persistent storage.

16. The non-transitory computer readable medium of claim 15,
wherein the RAID group is one of a plurality of RAID groups;
wherein the method the further comprises:
analyzing the plurality of RAID groups to determine a plurality of potential performance impairment values for the plurality of RAID groups;
ranking the plurality of RAID groups based on the plurality of potential performance impairment values and a criticality associated with each of the plurality of RAID groups to obtain a RAID group ranking; and
wherein determining the minimum and maximum set of spare members to allocate to the RAID group is based on the RAID group ranking, wherein allocating the minimum number of spare members to the RAID group and allocating an additional spare member to the RAID group is based on the RAID group ranking.

17. The non-transitory computer readable medium of claim 15, the method further comprising:
   after the enabling, determining that the additional spare member needs to transition to spare mode;
   based on the determining, migrating data stored on the additional spare member to at least a portion of the plurality of active members;
   transitioning, after the migrating, the additional spare member to spare mode, wherein the RAID controller is not able to store data in the additional spare member after it has transitioned to the spare mode.

18. The non-transitory computer readable medium of claim 15, wherein the RAID controller is not able to store data in any of the spare members.

19. The non-transitory computer readable medium of claim 15, wherein the RAID controller can only store data in the additional spare member up to a threshold amount, wherein the threshold amount is less than a capacity of the additional spare member.

20. The non-transitory computer readable medium of claim 15, wherein the RAID controller can only store data in the additional spare member up to a threshold amount, wherein the threshold amount is less than or equal to a sum of the remaining storage capacity of the plurality of active members.

* * * * *